United States Patent Office 3,850,849
Patented Nov. 26, 1974

3,850,849
FORMED ALUMINA BODIES FOR CATALYTIC USES
Joseph R. Kiovsky and Jeffrey W. Meacham, Kent, Ohio, assignors to Norton Company, Worcester, Mass.
No Drawing. Continuation-in-part of abandoned application Ser. No. 256,225, May 24, 1972. This application Jan. 16, 1973, Ser. No. 324,107
Int. Cl. B01j 11/06
U.S. Cl. 252—463                                    3 Claims

ABSTRACT OF THE DISCLOSURE

Shaped, strong, high purity alumina bodies, having high pore volume and desirable pore size distribution for optimum diffusion and catalysis of reactant gases or liquids are produced by mixing a desensitized microcrystalline boehmite grain with an acid activated microcrystalline boehmite, forming the mix to shape, drying and firing the shaped bodies at from 250 to 1200° C.

---

This application is a continuation-in-part of U.S. application Ser. No. 256,225, filed May 24, 1972, now abandoned.

BACKGROUND OF THE INVENTION

The invention relates to shaped alumina bodies of high porosity for use as catalysts and catalyst carriers.

In copending application Ser. No. 243,835, filed on Apr. 13, 1972, now abandoned, of Kiovsky, Meacham and Gerdes, is disclosed the use of acid treated microcrystalline boehmite as a bond for gibbsite alumina grains and boehmite alumina grains, to produce a shaped alumina body having a high proportion of relatively large pores. In prior application Ser. No. 142,004, of Kiovsky and Meacham, filed Apr. 10, 1971, now abandoned, is disclosed the aqueous acid treatment of microcrystalline boehmite to produce an extrudable free flowing mass capable of being shaped and fired to form alumina bodies of high strength and a purity of 99.5% or higher. One defect of such products for certain uses is the fact that a large part of the pore volume is represented by extremely small pores, thus limiting the diffusion of reactants to catalytic surfaces of the bodies.

The present invention provides catalyst bodies having improved pore size distribution and high total porosity; and a means for producing such bodies.

SUMMARY OF THE INVENTION

The present invention resides in the discovery that acid treated microcrystalline boehmite can be employed as a bond for a grain which comprises microcrystalline boehmite that has been inactivated to acid by a controlled heat treatment.

As used in the present application the term microcrystalline boehmite refers to what is sometimes called pseudoboehmite. The material is made up of aggregates of platy crystallites such as aggregates typically ranging from 1 to 40 microns in diameter, and in all cases averaging under 90 microns in diameter. The crystals in the aggregates are platy in habit and smaller than 750 angstroms in diameter preferably less than 100 angstroms in diameter. Furthermore microcrystalline boehmite is characterized by having a molar ratio of chemically combined water to alumina of between 1.16 and 2, preferably between 1.2 and 1.6. This product is distinguishable from boehmite produced by controlled calcination of gibbsite, which is well crystallized and has a typical average crystal size of over 1000 angstroms.

One commercially available microcrystalline boehmite is sold under the trademark Catapal S and Catapal SB, by Continental Oil Company, and is produced by the hydrolysis of aluminum alcoholates. Another microcrystalline boehmite is sold by Kaiser-Chemical Company under the designation KCSA-M alumina.

Suitable boehmites (i.e. microcrystalline boehmites) are further characterized by their ability to be dispersed by certain monobasic acids. The dispersability of any given sample of boehmite, and thus its active microcrystallinity, can be determined by treating the sample with dilute nitric acid, centrifuging the sample to separate the coarser crystals and agglomerates from the liquid, and measuring the light transmittance of the liquid. By the specific test described below the transmittance for active microcrystalline boehmite is less than 50% and preferably less than 20%.

The method for determining the transmittance is as follows:

(1) Weigh a 3.0 gram sample into a 150 ml. beaker, add 25 ml. of 0.5 normal $HNO_3$, add a stirring bar and cover with a watch glass.

(2) Place the beaker on a magnetic stirrer and stir for 10 minutes at a speed of 900 to 1100 r.p.m.

(3) Transfer the contents of the beaker to a centrifuge bottle and dilute with distilled water to bring the volume to 90 ml.

(4) Centrifuge the sample in a 9⅞ inch radius centrifuge at 1000 r.p.m. for 20 minutes.

(5) Measure the transmittance of the supernatent liquid in a 10 mm. test cell at a wavelength of 450 millimicrons, as a percent of the transmittance of distilled water.

Heat treatment of microcrystalline boehmite results in a loss of water which, as it progresses, gradually desensitizes the boehmite to dispersion by acid by removing the chemically combined hydroxyls from between the microcrystalline boehmite platelets, causing shrinkage, desensification and increased bonding between the platelets. We have found that heat treatment for from 5 minutes to 2 hours, at 250° C. or higher converts the microcrystalline boehmite to a desensitized form having a transmittance, T, by the test described above, of higher than 50%.

The desensitized microcrystalline boehmite, which is the grain, or material to be bonded, should constitute from 10 to 85% of the mix, exclusive of water and acid, the microcrystalline boehmite, the bond, constituting from 15 to 90% of the dry mix.

The water added to the mix can vary from 50 to 160 parts per hundred parts of bond and grain.

The mole ratio of acid to alumina as $Al_2O_3$ in the bonding material can vary from 0.128, at the lower limit to 1.28 at the upper.

Pore volume and pore size measurements as used herein are made by the mercury porosimetry method, and take no account of pores smaller than 44 angstroms in diameter. The novel products of this invention have a total pore volume (exclusive of pores smaller than 44 angstroms) of at least 0.9 cubic centimeters per gram (cc./gm.), at least 0.5 cc./gm. of pores larger than 100 angstroms in diameter, at least 0.35 cc./gm. of pores larger than 350 angstroms in diameter and at least 0.30 cc./gm. of pores larger than 1000 angstroms in diameter. Such porosity is the inherent porosity of the fired mix, and is exclusive of any porosity which may be induced in the product by the use of burnout material, such as cellulose.

The alumina present in the products of this invention will be boehmite and/or one or more of the forms of alumina resulting from the heating of boehmite: gamma, delta, theta, and alpha alumina.

Particularly preferred, low fired products containing (no alpha or theta alumina) have an inherent porosity (i.e. exclusive of burnout material) characterized by: a pore volume of at least 1.2 cubic centimeters per gram, a porosity of at least 0.45 cubic centimeters per gram of pores larger than 1000 angstroms, and a surface area of at least 90 square meters per gram.

The aqueous acid used in the mix to activate the microcrystalline boehmite bond is preferably formic acid, but other monobasic acids such as acetic, hydrochloric, nitric, and propanoic may be employed. Acids with anions larger than that of propanoic acid are not suitable. The acid is used in dilute form 2 parts of 90% formic acid being typically added to 60 parts of water, for example. The microcrystalline boehmite powder can be mixed with the desensitized microcrystalline boehmite grain and the aqueous acid added to the dry mix. Mixing employing a minimum amount of shear and pressure to thoroughly mix as with a V blender or cone blender is continued until a granular, free flowing mix is obtained. Continuation of mixing eventually will result in a pasty, doughy, mix of undesirable handling properties and undesirable properties in the fired product. After forming to shape, as by extrusion, the pellets or other shapes are dried and fired to temperatures ranging from 250 to 1200° C.

The flat plate crushing strength referred to herein was measured on a commercially available tester, Research Products Crush Tester. The pellets tested were 1/8 inch diameter 1/4 inches in length, the force being applied perpendicular to axis of the pellets.

Depending on the firing temperature, the surface area of the products of this invention, as measured by the standard B.E.T. method, may vary from 10 to over 280 square meters per gram.

ILLUSTRATIVE EMBODIMENTS OF THE INVENTION

The following example illustrates the invention:

Example I

A quantity of KCSA-M microcrystalline boehmite was heat treated at 400° C. Seventy parts of this heat treated microcrystalline boehmite and 30 parts Catapal S were placed in a Hobart high intensity mixer. In a separate vessel, three parts 90% formic acid and 100 parts water were mixed. The dilute acidic solution was then added to the dry ingredients in the mixer and mixed. A remaining 50 parts water were also added to the mix to bring it to a moist powder consistency. This mix was then extruded as 1/4" x 1/4" pellets, air dried and fired to 537° C. Properties of the fired extrudates were:

| Surface area, m.²/gm. | Flat plate crushing strength, lbs. | Pore volume, $V_p$, cc./gm. | | | |
|---|---|---|---|---|---|
| | | >44 A. | >100 A. | >350 A. | >1,000 A. |
| 220.9 | 24.6 | 1.293 | 0.980 | 0.608 | 0.530 |

Acid treated microcrystalline boehmite, alone, without added untreated microcrystalline boehmite results in a low total pore volume. Thus, in an attempt to produce a product of high total porosity by preserving the inherent large pore volume and macroporosity of fired microcrystalline boehmite, a portion of microcrystalline boehmite was acid treated and added to untreated microcrystalline boehmite on the assumption that the acid might all react with the bond material and not attack the microcrystalline boehmite grain portion of the mix. Unlike the products of the present invention, the porosity was not preserved, as shown in Example 2, which is not within the present invention.

Example II

Seventy parts Catapal S and 1/2 part cellulosic binder were placed in a Hobart high intensity mixer and mixed. In a separate vessel, three parts 90% formic acid and 40 parts water were mixed. The dilute acidic solution was then added to the dry ingredients in the mixer and mixed thoroughly. Thirty parts of KCSA-M were next added slowly to the mixture. Finally, a remaining 40 parts water were added and mixed until granular.

The mix was then extruded as 1/16" pellets of varying lengths, air dried and fired to 536° C. Properties of the fired extrudates were:

| Surface area, m.²/gm. | FPCS, lbs. | Pore volume, $V_p$, cc./gm. | | | |
|---|---|---|---|---|---|
| | | >44 A. | >100 A. | >350 A. | >1,000 A. |
| 248.2 | | 0.580 | 0.065 | 0.042 | 0.035 |

The following example, within the present invention shows the results when the mix of Example I is shaped and then fired to 800° C.

Example III

A portion of the 1/4" x 1/4" pellets extruded in Example I were air dried and fired at 800° C. The properties of the fired extrudate were:

| Surface area, m.²/gm. | FPCS, lbs. | Pore volume, $V_p$, cc./gm. | | | |
|---|---|---|---|---|---|
| | | >44 A. | >100 A. | >350 A. | >1,000 A. |
| 174.9 | 35.4 | 1.008 | 0.785 | 0.384 | 0.312 |

Examples IV and V show that larger amounts of bond may be employed.

Example IV

A quantity of KCSA-M microcrystalline boehmite was heat treated at 400° C. Seventhy parts of this heat treated microcrystalline boehmite and 30 parts Catapal S were placed in a Hobart high intensity mixer. In a separate vessel, three parts 90% formic acid and 100 parts water were mixed. The dilute acidic solution was then added to the dry ingredients in the mixer and mixed. A remaining 50 parts water were also added to the mix to bring it to a moist powder consistency. To this mixture ten parts of Catapal S were added and mixing continued for another ten minutes. The mix was then extruded as 1/4" x 1/4" pellets, air dried and fired at 537° C. Properties of the fired extrudate were:

| Surface area, m.²/gm. | FPCS, lbs. | Pore volume, $V_p$, cc./gm. | | | |
|---|---|---|---|---|---|
| | | >44 A. | >100 A. | >350 A. | >1,000 A. |
| 224.1 | 35.2 | 0.341 | 0.768 | 0.440 | 0.366 |

Example V

A quantity of KCSA-M microcrystalline boehmite was heat treated at 400° C. Seventy parts of this heat treated microcrystalline boehmite and 30 parts Catapal S were placed in a Hobart high intensity mixer. In a separate vessel, three parts 90% formic acid and 100 parts water were mixed. The dilute acidic solution was then added to the dry ingredients in the mixer and mixed. A remaining 50 parts water were also added to the mix to bring it to a moist powder consistency. To this mixture, 20 parts Catapal S were added and mixing continued for another ten minutes. This mix was then extruded as 1/4" x 1/4" pellets, air dried and fired to 537° C. The fired extrudates properties were:

| Surface area, m.²/gm. | FPCS, lbs. | Pore volume, $V_p$, cc./gm. | | | |
|---|---|---|---|---|---|
| | | >44 A. | >100 A. | >350 A. | >1,000 A. |
| 227.5 | 29.5 | 1.447 | 0.994 | 0.664 | 0.48 |

Except for added active catalytic material, such as copper, iron, nickel, cobalt, platinum and their oxides, which may be incorporated into the alumina bodies by incorporation in the mix, or by later impregnation of the bodies, the bodies of this invention, on an anhydrous basis are at least 99% $Al_2O_3$.

Where desired, burnout material or volatizable material may be added to the mix to produce induced pores in the fired bodies. The porosity reported in the examples given above represents the inherent porosity of the mix, exclusive of any induced porosity produced by added pore forming material. Cellulose or other equivalent organic material is a useful pore former. Paradichlorobenzene may also be employed.

What is claimed is:

1. A shaped, large pored, high porosity, high strength alumina catalyst body having a total porosity of at least 0.9 cc./gm., at least 0.5 cc./gm. of pores larger than 100 angstroms diameter, at least 0.35 cc./gm. of pores larger than 350 angstroms diameter and at least 0.30 cc./gm. of pores larger than 1000 angstroms in diameter, said porosity being exclusive of any pore volume produced by adding a particulate burnout material, a surface area from 10 to over 280 square meters per gram, said bodies consisting of at least 99 weight percent of alumina exclusive of combined or adsorbed water and exclusive of added catalytic metal or metal oxides, said alumina being predominantly in a form selected from the group consisting of boehmite, gamma alumina, delta alumina, theta alumina, alpha alumina and mixtures thereof.

2. A method of making bonded high purity, high strength, large pored alumina bodies by:

mixing a microcrystalline boehmite bonding material with a monobasic aqueous acid selected from the group consisting of formic acid, acetic acid, hydrochloric acid, nitric acid and propanoic acid, the mole ratio of acid to $Al_2O_3$ in the bonding material being from 0.128 to 1.28 and a desensitized microcrystalline boehmite produced by heating a microcrystalline boehmite for from 5 minutes to 2 hours at a temperature of at least 250° C., thereby resulting in a transmittance, T, of greater than 50% wherein the bonding material comprises from 15 to 90 percent by weight of the dry ingredients of the total mixture, forming to shape, drying and firing at a temperature of from 250 to 1200° C.

3. A catalyst body as in claim 1, having a surface area of 90 square meters per gram a total porosity, exclusive of porosity produced by burnout material, of at least 1.2 cubic centimeters per gram, and a porosity of at least 0.45 cubic centimeters per gram of pores larger than 1000 angstroms, exclusive of burnout pores, said body being predominantly of a form of alumina selected from the group consisting of boehmite, delta alumina, gamma alumina, and mixtures thereof.

References Cited
UNITED STATES PATENTS

| | | | |
|---|---|---|---|
| 3,031,418 | 4/1962 | Bugosh | 423—625 X |
| 3,317,277 | 5/1967 | Cosgrove | 252—463 X |
| 3,357,791 | 12/1967 | Napier | 423—630 X |
| 3,628,914 | 12/1971 | Graulier | 252—463 X |

DANIEL E. WYMAN, Primary Examiner

W. J. SHINE, Assistant Examiner

U.S. Cl. X.R.

423—626, 628

UNITED STATES PATENT OFFICE
CERTIFICATE OF CORRECTION

PATENT NO. : 3,850,849
DATED : November 26, 1974
INVENTOR(S) : Joseph R. Kiovsky and Jeffrey W. Meacham It is certified that error appears in the above-identified patent and that said Letters Patent are hereby corrected as shown below:

Column 2, line 68: after "containing" - only boehmite, delta alumina, gamma alumina, and mixtures thereof - should be inserted Column 4, line 28: "Seventhy" should read - Seventy -

Column 4, line 44: "0.341" should read - 1.341 -

Column 4, line 64: "0.48" should read - 0.488 -

Signed and Sealed this fifth Day of August 1975

[SEAL]

Attest:

RUTH C. MASON
Attesting Officer

C. MARSHALL DANN
Commissioner of Patents and Trademarks